Nov. 5, 1946.　　　　A. C. THOMSON　　　　2,410,533
HELICOPTER WITH COAXIAL ROTORS AND CONTROL MEANS THEREFOR
Filed March 6, 1944　　　　4 Sheets-Sheet 1

ALAN C. THOMSON,
INVENTOR.

BY
ATTORNEY

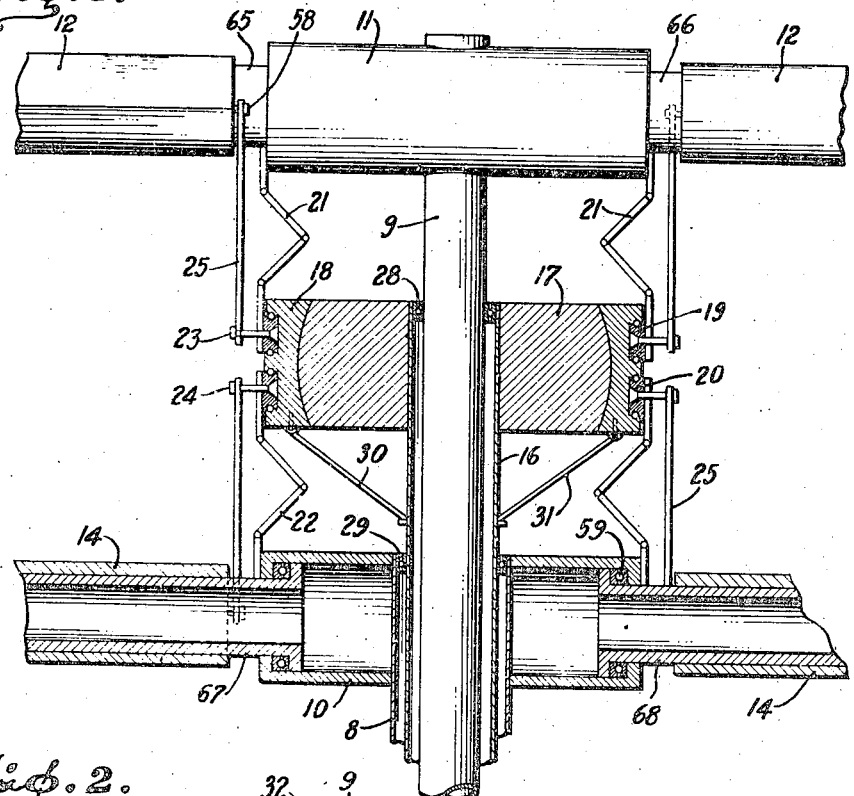
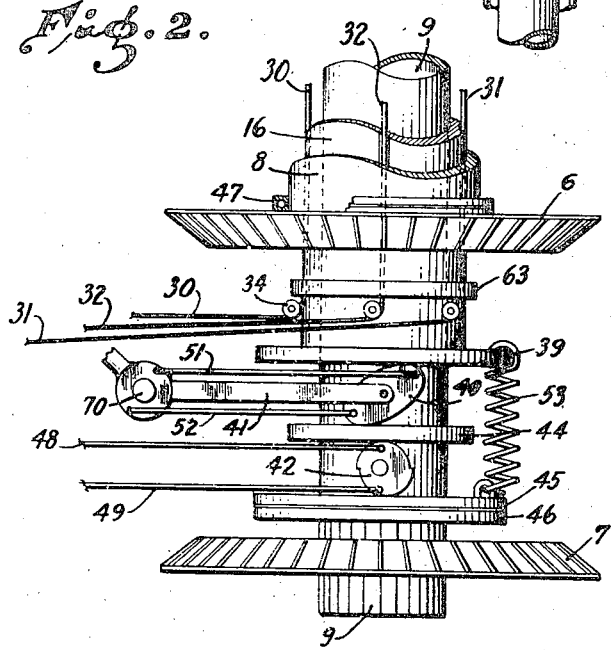

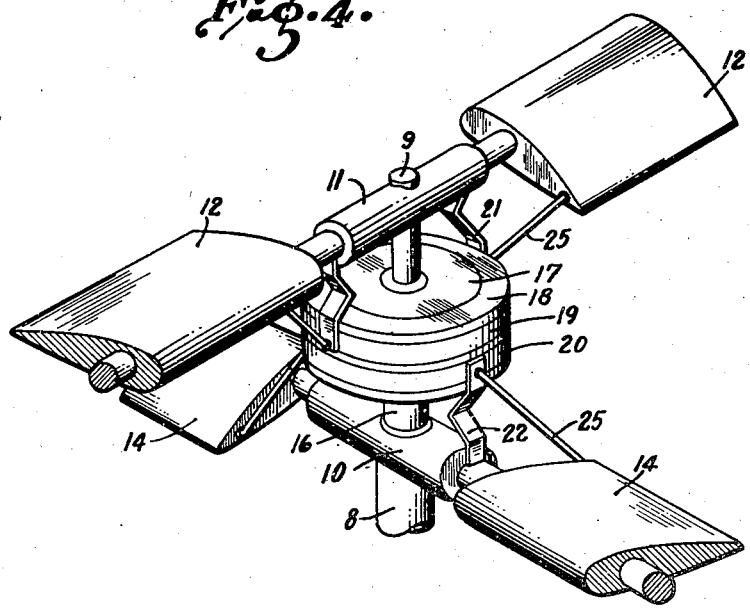
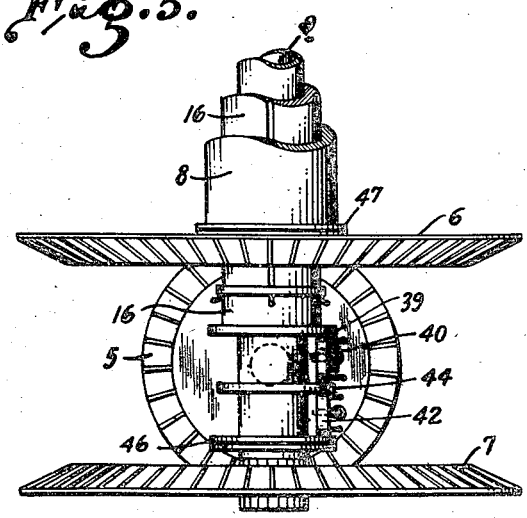

Nov. 5, 1946.   A. C. THOMSON   2,410,533
HELICOPTER WITH COAXIAL ROTORS AND CONTROL MEANS THEREFOR
Filed March 6, 1944   4 Sheets-Sheet 4

ALAN C. THOMSON,
INVENTOR.

BY
ATTORNEY

Patented Nov. 5, 1946

2,410,533

UNITED STATES PATENT OFFICE 2,410,533

HELICOPTER WITH COAXIAL ROTORS AND CONTROL MEANS THEREFOR

Alan Charles Thomson, Los Angeles, Calif.

Application March 6, 1944, Serial No. 525,245

5 Claims. (Cl. 244—17)

1

This invention relates to an airplane of the helicopter type, and has for one of its objects provisions for a simple construction which will be safe in operation, and can govern all directions of flight through control of the blades.

This invention employs the use of two co-axial contra-rotating screws with a plurality of blades, and a means of varying the pitch of each blade throughout its cycle. This eliminates the need for all external control surfaces or steering devices, thus simplifying the fuselage construction and increasing the efficiency of this machine. Also, the total pitch of all blades may be altered to govern the vertical movement of the craft. Turning is accomplished by altering the pitch of the upper and lower set of blades in opposite directions, introducing torque in the blades without changing the total pitch. By this method there is no torque on the fuselage nor auxiliary turning devices that require power from the engine.

It has heretofore been proposed to mount the engine between the two sets of blades. This is objectionable because it raised the center of gravity and the engine is outside. It has also been proposed to transmit a controlling force to one set of blades through a mechanical movement of which the other set of blades forms a part. This is objectionable because one cannot trim the craft so both sets of blades must be trimmed in the same direction, thus requiring a rudder to steer the craft.

The above objections are overcome according to the present invention by making it possible to tilt either set of blades in one direction and the other set in the opposite direction to turn the craft, through the use of a common control unit which individually controls the sets of blades.

A better understanding of my invention, its objects and advantages, may be had when reference is made to the accompanying drawings, wherein:

Fig. 2 is a side elevation of the bevel gears, omitting the pinion gear for clarity, and showing the control cams and cables.

Fig. 3 is a side elevation of the propeller shafts and control head, with a portion of the lower propeller hub and control head removed, showing construction of the interior.

Fig. 4 is a perspective view of the propeller blades, control head and connecting linkage. This shows a portion of all blades broken away.

Fig. 5 is a front elevation of the gears and control cams.

2

Figure 1:
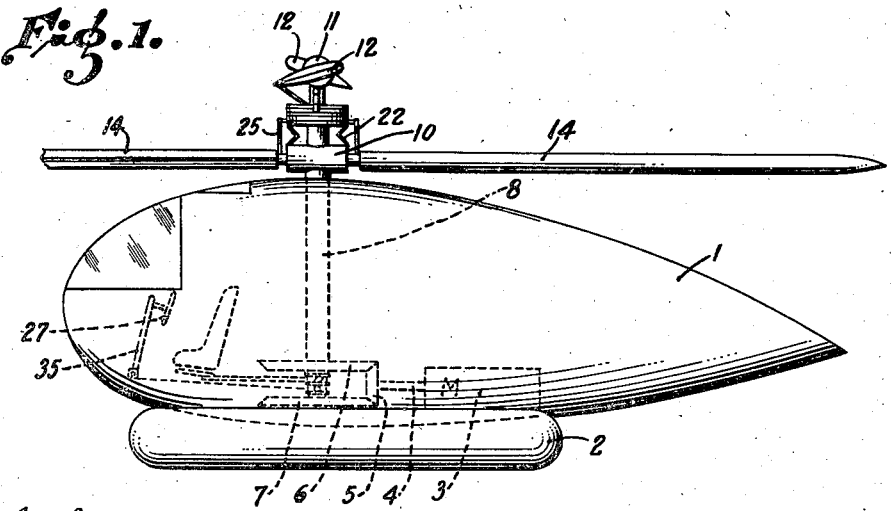
Fig. 1 is a side view of the machine constructed in accordance with the present invention.
Figure 6:
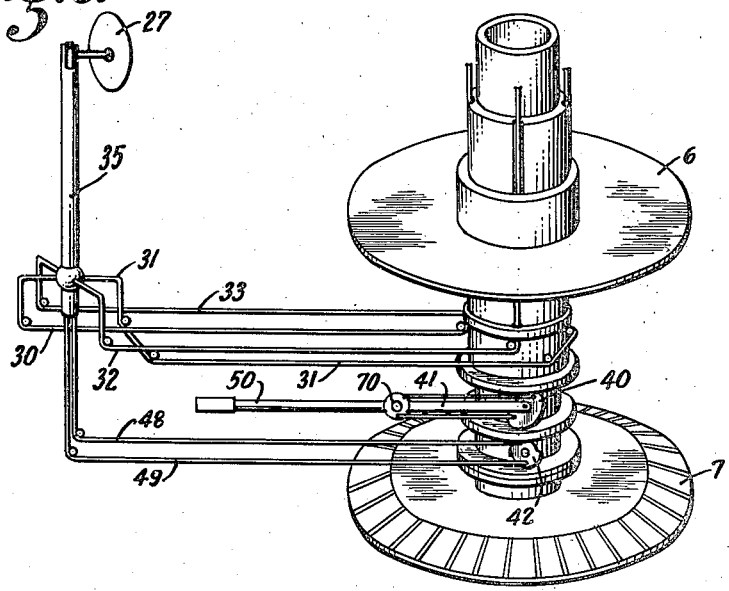
Fig. 6 shows a perspective view of the control column and attachment by cables to the cams.
Figure 7:
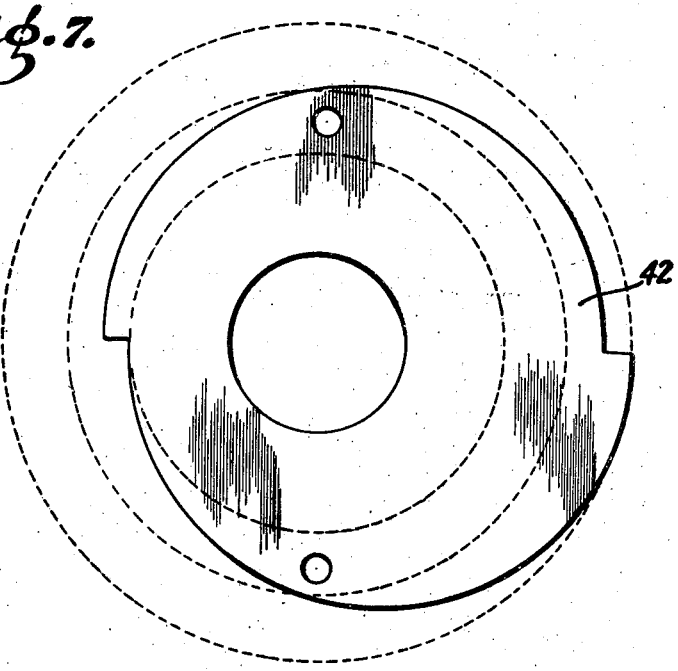

Fig. 7 is an enlarged side elevation of the turning cam.

Figure 8:
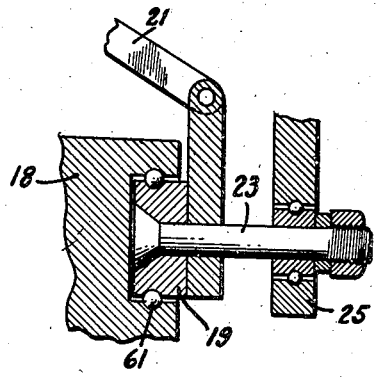

Fig. 8 is an enlarged sectional view of the ring, which governs movement of the upper set of blades.

Referring now to the drawings, wherein all numbered parts correspond throughout all views, 1 represents a fuselage of suitable construction being supported by floats 2 in this case, but which can be supplanted with wheels.

Fixed to the fuselage 1 and located preferably in the rear, is a motor 3. This motor can be of any suitable type, but the horizontally opposed type is preferred for the cooling arrangement. From this motor extends drive shaft 4, which is journaled against side movement to the frame. Attached to the end of the shaft is pinion gear 5. Meshed with pinion gear 5 are the bevel gears 6 and 7. The necessary gear reduction is taken up in the proportion of these gears. By locating bevel gears 6 and 7, one above, and one below pinion gear 5, they can be made to rotate in opposite directions and at equal speeds.

Extending upwards from and connecting directly to bevel gear 6, is the outer tubular drive shaft 8. The inner drive shaft 9 is also tubular and extends from lower bevel gear 7 to a point above the top of shaft 8. The inner drive shaft 9 is splined at its base to allow slight vertical travel of the shaft for the purpose of turning the craft as will be explained later.

Attached to the upper limits of shafts 8 and 9 are the propeller hubs 10 and 11 to which are connected propeller blades 14 and 12 respectively. All the blades attached to the upper hub 11 are similar and will be referred to as 12. The lower set of blades are opposite to the upper set, but are similar to each other and will be referred to as set 14. The upper set of blades 12 rotate in one direction with hub 11, while the lower set 14 rotate in the opposite direction with hub 10. Due to the gearing, this opposite rotation will be of the same velocity.

Between the two drive shafts 8 and 9 is the control tube 16. This tube is journaled against shafts 8 and 9 in four places. With suitable bearings 29 against the outer drive shaft at each extremity, and bearings 28 at the extremity of the control tube against the inner drive shaft, side movement is prevented, thus keeping all shafts aligned. Both bearings 28 and 29 must permit in addition to rotational movement, end movement to prevent binding of control tube 16 as it is moved vertically.

Attached to the upper end of control tube 16 is an arrangement which consists essentially of a truncated ball 17 and socket 18. Around the outer circumference of the socket 18 are two grooves in which travel rings 19 and 20. The two rings 19 and 20 travel with the propeller hubs; one with the upper hub 11 and one with the lower hub 10. The socket 18 does not rotate as do the rings 19 and 20, but merely tilts, thus changing the plane of travel of the rings 19 and 20. The two rings 19 and 20 are supported by bearings 61 to reduce friction against the socket 18. There are two diametrically opposite bolts 23 in the upper ring 19, and two bolts 24 in the lower ring, extending from diametrically opposite points. These points are, in the case of a two bladed propeller hub, directly in line with the center line of the propeller shafts 54 and 55. The rings 19 and 20 are driven by flexible arms 21 and 22. The arms 21 and 22 are attached to the propeller hubs 10 and 11 at their outer ends, and drive the bolts 23 and 24, and consequently the rings 19 and 20 at their inner ends. By the design of these arms 21 and 22, movement of the rings 19 and 20 can only be in a vertical direction thus keeping the bolts 23 and 24 directly in line with the center line of the propeller hubs 10 and 11.

The propeller shafts 65, 66, 67, 68 are all journaled at their inner extremities with bearings like 59 against the propeller hubs 10 and 11. As all blades 12 and 14 are constructed in the same manner, a description of one will suffice for all. The blade 14 consists of a tubular shaft 67 tapered if desired, extending the length of the blade. Built around the shaft are a series of airfoil sections which have been chosen for high efficiency and low center of pressure movement. The airfoil has no moving parts but is rotated about its longitudinal axis. As the tube 67 is very near the center of pressure, the whole airfoil is rotated to obtain the desired angle of incidence. This change in angle is controlled by connecting arm 25 which extends from the bolts 23 and 24 to the trailing end of each blade on the inboard side at stud 58. The connection at bolt 23 and bolt 24 is through bearing 26 to permit the necessary movement caused by tilting the socket 18.

Now it can be seen that as the socket 18 is tilted in any direction, the rings 19 and 20, instead of rotating in a horizontal plane, will follow the angle of the socket. As the trailing edge of each blade is connected to the ring through rod 25, tilting the ring will effect the angle of incidence of each blade as it rotates. That is to say, if the socket is tilted downward to the rear of the aircraft, each blade as it passes the lowest point will have its pitch increased. As it continues through a half turn, it will have its pitch decreased the same amount it was increased, thus giving more lift to the rear of the ship, moving it forward and governing directional movement.

To control this movement of the socket, there are four cables 30, 31, 32 and 33. The cables are attached to their respective quadrants on the socket 18 and to the extensions 36 of control stick 35 at the other end. The cables are passed down the control tube 16 by means of a ring 62 which fits snugly around the upper end and guides the cables into the grooves such as 69, which have been cut in the tube. These grooves 69 permit the cables, 30—33 to pass under the bearings 28 without any interference. There is a similar ring 63 at the lower end of the grooves 69 for the purpose of guiding the cables 30—33 out into their pulleys 34. Thus any movement of the control stick 35 is transferred to the socket 18, thus producing a movement in the direction the stick is tilted.

Fastened to the lower end of the control tube 16 is a flange 39. This flange 39 is acted upon by a cam 40 which governs the vertical movement of the aircraft by altering the pitch of all blades simultaneously. Cam 40 is attached by cables 51 and 52, tension being provided by rod 41, to lever 50. This lever 50, beside the operators seat, can be raised or lowered as desired. Raising the lever 50 raises the craft, and depressing the lever does the opposite, and lowers it. As the cam 40 is rotated by moving lever 50, and assumes a more horizontal position, the control tube 16 is lowered, consequently lowering the trailing edge of each blade and increasing the pitch of all blades equally, regardless of the angle of the rings 19 and 20. As the cam 40 is turned towards the vertical, the flange 39 and the tube 16 are raised, decreasing the pitch of the blades, thus lowering the helicopter.

Cam 40 is rotated about the inner end of rod 41, the outer end of which is pivotally connected to the elongated rod 41 at 70. Pivotal connection 70 allows vertical travel of cam 40 when cam 42 is rotated. The cam 42 is connected by cables 48 and 49, guided by the pulleys 34 up through control stick 35, and fastened around shaft of steering wheel 27. Therefore as wheel 27 is turned in the desired direction, the cables 48 and 49 transmit the movement to cam 42.

The center of rotation of cam 42 is a fixed point, with reference to the frame of the aircraft, and does not oscillate as does rod 41 and cam 40. Between cams 40 and 42 is a floating flange 44 which provides a bearing surface for the two cams.

Acting on the lower surface of cam 42 is a flange 45 which is journaled against flange 46. Flange 46 is directly connected to inner drive shaft 9.

The helicopter may be turned by an increased resistance on one set of blades and an equal decrease in the resistance of the other set, for the following reason. As the cam 42 is rotated by turning wheel 27, the upper half of the cam, riding on flange 44, will move exactly one half the distance of the lower half, which is riding on flange 45, and in the same direction. This movement is transferred to the socket 18 by means of the control tube 16, and to the upper set of blades by means of the inner shaft 9. Therefore, as the tube 16 and socket 18 move in either direction, the distance between them and the lower set of blades is changed thus altering the pitch and changing the resistance. This would be true of the upper set also, if it were not for the fact that the inner shaft 9 and propeller hub 11 moved twice as far as the socket 18, and in the same direction. The resistance has been changed in the upper set of blades, or lower set, as the case may be, in equal amounts but opposite direction to the other set, thereby introducing the torque that turns the helicopter.

By this arrangement a more compact unit may be built, with fewer moving parts, and hence lighter in weight.

The operation may be briefly summarized as follows:

(1) The craft may be raised or lowered vertically by tilting the control 50 to tilt all blades the same angle and amount.

(2) The craft may be turned in a horizontal plane or direction by turning the steering wheel 27 to tilt either set of blades up and the other set down to change the relative pitch of the two sets of blades.

(3) The craft may be tilted in a vertical direction by tilting the stick 35 which adjusts the angle of incidence of each of the blades of both sets periodically.

This arrangement of having all blades and control rods operating from a common unit, namely the socket, any external forces on any blade will be transmitted through the socket and will be dampened by all the other blades.

It is to be understood that the description given in the foregoing text is for the purpose of illustration only and is not definitive of the limits of the inventive idea, as various changes may be made in the construction and arrangement of parts within the scope of the following claims.

I claim:

1. A helicopter having co-axial contra-rotatable shafts, a set of blades for each of said shafts, a tilt control head co-axial with said shafts, means supporting said tilt control head for tilting movement, a control shaft intermediate said coaxial shafts, an operative connection between said control shaft and said tilt control head, means supporting said control shaft for reciprocating non-rotary movement, tilt connections between said control head and each of said sets of blades, and means for reciprocating said control shaft to operate said control head to change the angle of incidence of the blades of both sets in the same manner.

2. A helicopter comprising co-axial contra-rotatable shafts, a set of blades for each of said shafts, means supporting one of said shafts for axial movement, a control head having tilt connections to both of said sets of blades, means supporting said control head for axial movement, and an oscillating cam member having a cam surface for moving said movable shaft and having another cam surface for moving said control head axially to thereby move said control head substantially one-half the distance said movable shaft is moved, to change the pitch of said sets of blades substantially equally in opposite respects.

3. A helicopter having upper and lower contra-rotatable drive gears, a hollow drive shaft secured to said upper gear, a set of blades at the upper end of said shaft, a co-axial inner shaft having a spline connection with said lower gear, the upper end of said inner shaft projecting above said outer shaft, a set of blades at the upper end of said inner shaft, a control tube between said shafts, a tilt control head co-axial with said inner shaft and arranged on said control tube between said sets of blades, tilt connections between said control head and each of said sets of blades, means for tilting said control head, means supporting said control tube for axial movement, means for axially moving said control tube and said control head without axially moving said inner shaft, and means for moving both said control tube and said inner shaft to thereby move said control tube substantially one-half the distance said inner shaft is moved.

4. A helicopter comprising coaxial contra-rotatable shafts, a set of blades for each of said shafts, a control head having tilt connections to both of said sets of blades, means for axially moving said control head relatively to both of said shafts, a cam member having a cam surface for axially moving one of said shafts and having another cam surface for moving said control head in the same direction, said cam surfaces being so constructed and arranged that the movement of said control head is substantially one-half the movement of said movable shaft, and means for tilting said control head.

5. A helicopter having inner and outer co-axial contra-rotatable shafts, a set of blades for each of said shafts, a tilt control head co-axial with said shafts, means supporting said tilt control head for tilting movement, tilt connections between said control head and each of said sets of blades, a control tube intermediate said co-axial shafts for operating said control head, a cam follower on said control tube, a floating oscillatable cam underneath said follower, a lower oscillatable cam having a fixed pivot and having two reverse cam surfaces, a floating flange between the bottom of said floating cam and the top of said fixed pivot cam, a cam follower on said inner shaft at the bottom of said fixed pivot cam, and means for operating each of said cams.

ALAN CHARLES THOMSON.